United States Patent
DeFrang

(10) Patent No.: US 8,341,132 B2
(45) Date of Patent: Dec. 25, 2012

(54) SYSTEM AND METHOD FOR APPLYING DELTAS IN A VERSION CONTROL SYSTEM

(75) Inventor: Bruce DeFrang, Batavia, IL (US)

(73) Assignee: CA, Inc., Islandia, NY (US)

( * ) Notice: Subject to any disclaimer, the term of this patent is extended or adjusted under 35 U.S.C. 154(b) by 511 days.

(21) Appl. No.: 12/243,263

(22) Filed: Oct. 1, 2008

(65) Prior Publication Data
US 2010/0082580 A1   Apr. 1, 2010

(51) Int. Cl.
G06F 17/30   (2006.01)
(52) U.S. Cl. ......... 707/695; 715/229
(58) Field of Classification Search ......... 707/625, 707/638, 649, 695; 715/229
See application file for complete search history.

(56) References Cited

U.S. PATENT DOCUMENTS

| | | | | |
|---|---|---|---|---|
| 6,366,930 B1 * | 4/2002 | Parker et al. | | 1/1 |
| 6,493,732 B2 * | 12/2002 | Aoyama et al. | | 715/229 |
| 6,560,620 B1 * | 5/2003 | Ching | | 715/229 |
| 7,260,773 B2 * | 8/2007 | Zernik | | 715/229 |
| 7,398,466 B2 * | 7/2008 | Jeon et al. | | 715/229 |
| 7,401,291 B2 * | 7/2008 | Ramaley et al. | | 715/255 |
| 7,475,097 B2 * | 1/2009 | Kaler et al. | | 1/1 |
| 7,496,841 B2 * | 2/2009 | Hadfield et al. | | 715/255 |
| 7,788,237 B2 * | 8/2010 | Voronov et al. | | 707/695 |
| 7,849,399 B2 * | 12/2010 | Hoffmann | | 715/229 |
| 2001/0027460 A1 * | 10/2001 | Yamamoto et al. | | 707/536 |
| 2004/0230886 A1 * | 11/2004 | Livshits | | 715/500 |
| 2005/0060643 A1 * | 3/2005 | Glass et al. | | 715/501.1 |
| 2005/0097441 A1 * | 5/2005 | Herbach et al. | | 715/501.1 |
| 2005/0138540 A1 * | 6/2005 | Baltus et al. | | 715/511 |
| 2007/0260648 A1 * | 11/2007 | Friesenhahn et al. | | 707/203 |
| 2007/0260996 A1 * | 11/2007 | Jakobson | | 715/781 |
| 2008/0235569 A1 * | 9/2008 | Arun et al. | | 715/229 |

OTHER PUBLICATIONS

Microsoft, "Windows XP Professional Service Pack 3", 2002, pp. 2.*

* cited by examiner

*Primary Examiner* — James Trujillo
*Assistant Examiner* — Jorge A Casanova
(74) *Attorney, Agent, or Firm* — Pillsbury Winthrop Shaw Pittman LLP

(57) ABSTRACT

A system and method that efficiently maintains multiple versions of a dataset using recursive calls is provided. The method may include fully storing one or more versions of the dataset and storing only changes, called deltas, that occurred from one version to another. Using recursive techniques eliminates the need to generate interim versions in their entirety to generate a requested version. For each position in the requested version the method may include generating content by recursive calls. Each recursive call may initiate a request on an adjacent version to produce content at its corresponding position. The request triggers a recursive call by the adjacent version, which may in turn initiate another request on its adjacent version. This series of recursive calls may be repeated until a fully stored version, which simply returns its content, is reached. The requested version may then generated using content generated for each position by the recursive calls.

33 Claims, 4 Drawing Sheets

SYSTEM AND METHOD FOR APPLYING DELTAS IN A VERSION CONTROL SYSTEM

FIELD OF THE INVENTION

This invention relates to systems and methods for recursively applying deltas in version control systems.

BACKGROUND OF THE INVENTION

Version control systems (VCS) are used to store multiple versions of documents or other datasets. For example, software engineers use VCS to keep track of different versions of software code. This enables, inter alia, collaboration among different engineers as well as reversion to prior versions of software code.

Conventional VCS stores a single complete version of a dataset and deltas corresponding to changes in each additional version of the dataset rather than storing each full version. Deltas store only the changes from one version to another. Conventional VCS typically use either forward or reverse deltas. Use of forward deltas may involve storing a complete first version of a document or other dataset and deltas representing subsequent changes in versions. Use of reverse deltas may involve storing the most current complete version of a dataset and deltas representing prior versions. Whichever type of delta is stored, computing deltas in conventional VCS is inefficient because each interim version of a dataset is generated in its entirety when generating any particular version from the fully stored version. For example, if a dataset has 100 versions and the VCS employs forward deltas, when version 100 is requested, versions 2-99 are each fully generated in the interim. The same problem occurs if reverse deltas are used and version one is requested. For a dataset with multiple versions and potentially large quantities of data, this inefficiency can result in significant delays or cause other problems when requesting different versions of a document using conventional VCS. These and other problems exist.

SUMMARY OF THE INVENTION

The invention relates to a system and method for efficiently maintaining and retrieving multiple versions of a dataset using recursive programming techniques. In some implementations, content from each interim version is recursively generated by applying deltas at each interim version until a requested version is generated. An advantage of this aspect of the invention is that it eliminates the need to generate each interim version in its entirety to generate the requested version.

In some implementations, the invention may include a version control module, which may instantiate version objects based on the fully stored datasets and deltas (i.e., fully stored versions and deltas corresponding to changes in a version may be instantiated as version objects). Version objects may include position indicators associated with content at each position. Additionally, the version control module may also instantiate state objects that correspond to version objects. State objects may track a current position of the corresponding version object. The current position may be used during recursive calls to version objects to inform the version objects the position for which content is to be returned. State objects may also track the current delta of the corresponding version object. The current delta may indicate which delta of a version should be applied when a plurality of deltas exist at a particular position of a version.

In some implementations, the invention may include a method for version control. In some implementations, the method may include a user requesting a version. The user request may originate from the client or other access point. In response to the request, the version control module may retrieve versions necessary to generate the requested version from the repository (e.g., the closest fully stored version and any interim versions). The version control module may build version and state objects based on the retrieved versions. Content at each position of the requested version may be generated using recursive calls to adjacent versions, back to the closest fully stored version. Content generated at each position may be collected and used to generate the requested version. The requested version may then be returned to the user.

In some implementations, the invention may include a tangible computer readable medium having thereon computer readable code for instructing one or more processors to perform any or all of the features and functions of invention described herein.

These and other objects, features, and advantages of the invention will be apparent through the detailed description and the drawings attached hereto. It is also to be understood that both the foregoing summary and the following detailed description are exemplary and not restrictive of the scope of the invention.

DETAILED DESCRIPTION

The invention provides a system and method for efficiently storing and retrieving versions of datasets by applying a recursive process that retrieves a particular version of a dataset without storing or generating full interim versions of each dataset. As used herein, the term "dataset" may refer to any set of data that has two or more versions, such as, for example, a word processing document, software code, binary file, or other suitable dataset. As used herein, the terms "dataset" and "document" may be used interchangeably. In some implementations, at least one full version of a dataset and deltas corresponding to changes in other versions of a dataset are stored. As used herein, the term "delta" refers to a representation of how one version has changed with respect to another version. As there may be multiple changes in a dataset from version to version, a particular version may be associated with multiple deltas. For example, in some implementations, a delta may represent instructions to insert or delete text at a line in a document. Additionally, although some examples used herein relate to the use of forward deltas, the invention may be used with reverse deltas.

Figure 1:
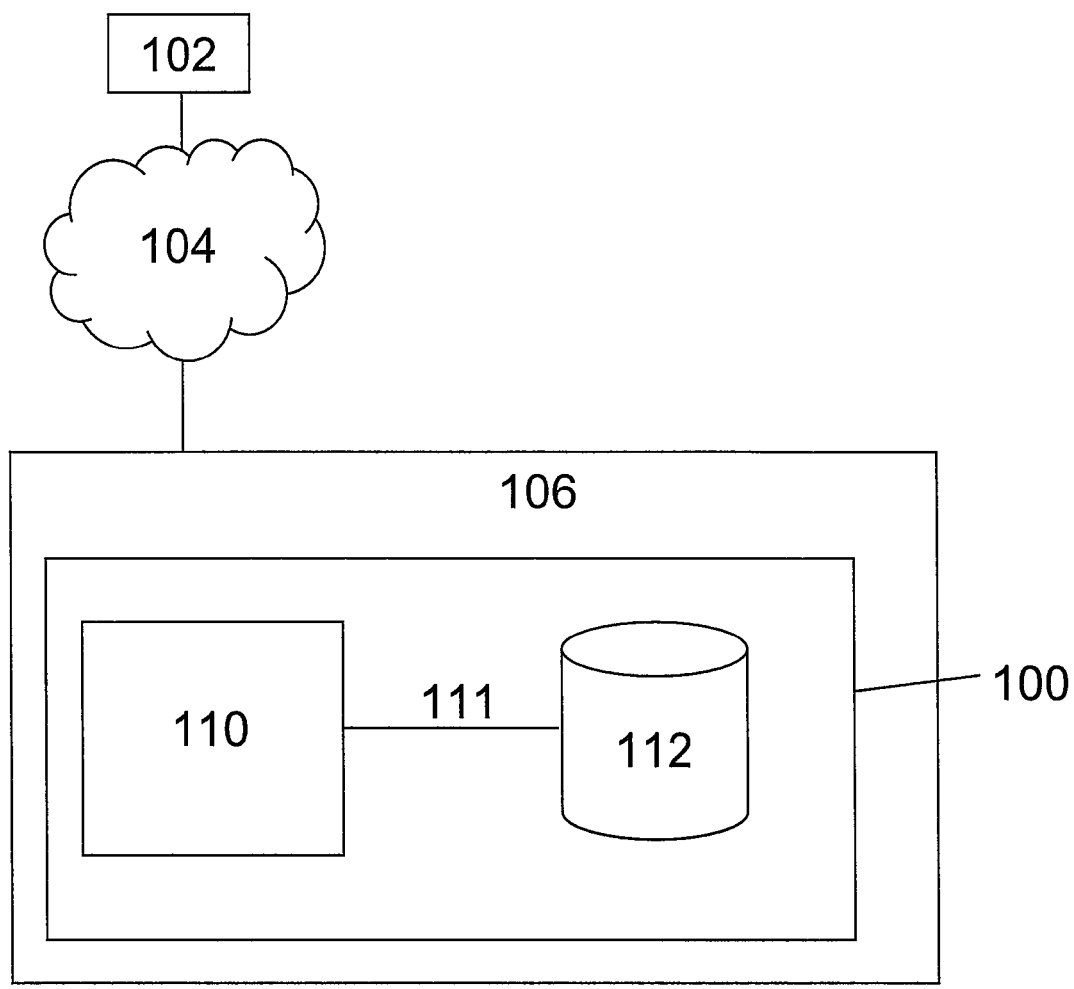
FIG. 1 illustrates an example of a system for version control according to various implementations of the invention.

FIG. 1 illustrates an example of a system 100 for storing and retrieving versions of datasets using recursive application of deltas. In some implementations, system 100 may include a version control module 110, a version control repository 112, and/or other elements. In some implementations, version control module 110 and/or version control repository 112 may be hosted or run on a server 106. Version control module 110 and version control repository 112 may be communicably coupled via a communication link 111. In some implementations, system 100 may be accessed by a client machine 102. In some implementations, this access may be enabled via a network 104, which may include a LAN, WAN, the Internet, or other computer network. In some implementations, system 100 may be accessed directly at server 106 or otherwise locally accessed. Although server 106 is shown as a single server, it should be understood that the invention may include a plurality of servers or other computer implemented machines having one or more processors and associated memory, wherein version control modules 110 and/or version control repository 112 may be distributed across the multiple servers or other machines.

In some implementations, version control module 110 may include one or more software modules that retrieves deltas to generate a requested version, controls other software modules, creates version objects, creates state objects, executes recursive calls, interfaces with the version control module, and/or performs other features or functions of the invention described herein.

In some implementations, version control repository 112 may be or include a relational database (that is accessed through, for example, database queries), a file system where at least one full version and deltas are stored as files, and/or other data storage system.

Figure 2:
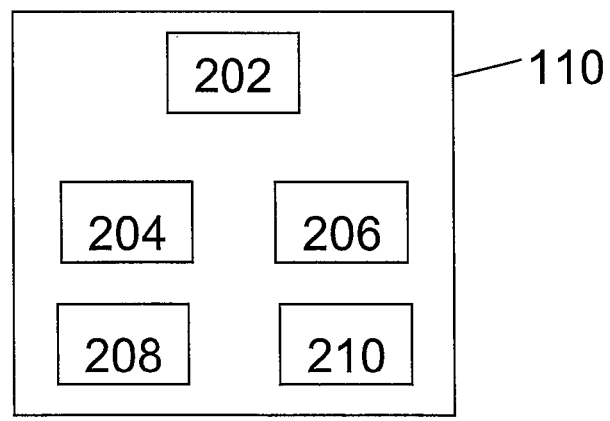
FIG. 2 illustrates an example of a version control module according to various implementations of the invention.

FIG. 2 illustrates version control module 110, which is an example of a module that may retrieve, and recursively apply deltas for version control. In some implementations, version control module 110 may include a controller module 202, a repository interface module 204, a version object module 206, a state object module 208, a recursion module 210, and/or other modules or elements. In some implementations, controller module 202 may receive requests to generate particular dataset versions. Controller module 202 may also retrieve any full datasets and/or deltas necessary to produce a requested version. In some implementations, controller module 202 may utilize repository interface module 204 to retrieve any full dataset and deltas necessary to generate the requested dataset versions from version control repository 112. In some implementations, repository interface module 204 may utilize, for example, database queries, file input/output, or any other suitable method to access version control repository 112.

In some implementations, controller module 202 may utilize version object module 206 to generate "version objects" for retrieved full datasets and retrieved deltas. In some implementations, a version object may include an instantiated object representing a version of a dataset, whether the version is stored as a full dataset or as one or more deltas. In some implementations, a version object may include a representation of the content of either a "fully stored version" or a "delta version," as well as position information regarding the content.

In some implementations, a fully stored version may be a version of the dataset that includes a complete contents of the dataset. A delta version may include only portions of the complete contents of the dataset represented by deltas. For example, if a stored full dataset is a text file organized using line numbers, the version object for the stored full dataset may include the text content for each line of the file and its corresponding line number (i.e., position information). A version object for a version stored as one or more deltas may include the text of changes from an adjacent version (which adjacent version depends on whether forward or reverse deltas are used) and the position where the changes occurred (i.e., position information). As such, version objects may identify content by its corresponding position. As used herein, "adjacent version" may refer to a version to which changes to adjacent data are specified by the one or more deltas. An adjacent version may include a prior or subsequent version, depending on whether forward or reverse deltas are used. "Adjacent data" may include data in an adjacent version to which the one or more deltas correspond. As such, adjacent data may be part of the adjacent version.

It should be understood that although instantiated representations of dataset versions may be described herein as "version objects," representations of dataset versions may be instantiated as "version data structures" that may perform the same functions as version objects when using programming languages that are not object-oriented. Furthermore, although line numbers are used as examples for position information, positions may include any other position indicator in a dataset such as a byte, index, or any other suitable position indicating unit.

In some implementations, for each instantiated version object, controller module 202 may utilize state object module 208 to instantiate a corresponding "state object." The instantiated state object may include a dynamic indicator that tracks a "current position" for a version object as the version object is used in constructing a requested version. The state object may also include a dynamic indicator that tracks a "current delta" for a version object as the version object is used in constructing a requested version. For example, a plurality of deltas may exist at a given position in a version object. In some implementations, the "current delta" of the state object may indicate which delta may be applied amongst the plurality of deltas existing at the position in the version object. It should be understood that although instantiated representations of states corresponding to dataset versions may be described herein as "state objects," representations of states may be instantiated as "state data structures" that may perform the same functions as state objects when using programming languages that are not object-oriented.

In some implementations, controller module 202 may utilize recursion module 210 to generate requested dataset versions by retrieving content at each position of a requested version. When a particular version of a dataset is requested, recursion module 210 may recursively retrieve content at each position for each necessary interim version back to the fully stored version. Because recursion module 210 applies deltas for each interim version and returns the results of the applied deltas.

For example, if version objects 2 and 3 originate from deltas and version object 1 originates from the stored full dataset and version 3 is requested, recursion module 210 may retrieve content for a first position of version 3 by a recursive call to retrieve one or more corresponding positions of version 2. Content for the one or more positions of version 2 may be generated by a recursive call to one or more corresponding positions of version 1. The first position of version 3 may correspond to multiple positions of version 2 because the systems and methods of the invention may take into account deletions and insertions between versions. Because version 1 is the stored full dataset, recursion module 210 simply retrieves content at the one or more positions of version 1 corresponding to the one or more positions of version 2. Recursion module 210 may apply any delta for version 2 (as represented by the version 2 version object) at the one or more positions of version 2 to the retrieved version 1 content to generate version 2 content at the one or more positions of version 2. Recursion module 210 may then apply any delta for the first position of version 3 content to generate the version 3 content at the first position. Controller module 202 may generate the entirety of the requested version (version 3) by repeating this process for each position in the requested version.

State objects corresponding to version objects representing versions 1, 2, and 3 may each dynamically track a "current position" for each of the corresponding version objects. As such, as the process for retrieving content is repeated for each position of the requested version, each state object may indicate to its corresponding version object the current position of content that may be returned when a request for content is made to the corresponding version.

It should be understood that although version object module 206, state object module 208, and recursion module 210 are illustrated separately, version object module 206 may include one or more of state object module 208 or recursion module 210 without departing from the scope of the invention. Furthermore, although version objects and state objects are described separately, version objects may include state objects or state objects may include version objects without departing from the scope of the invention.

Figure 3:
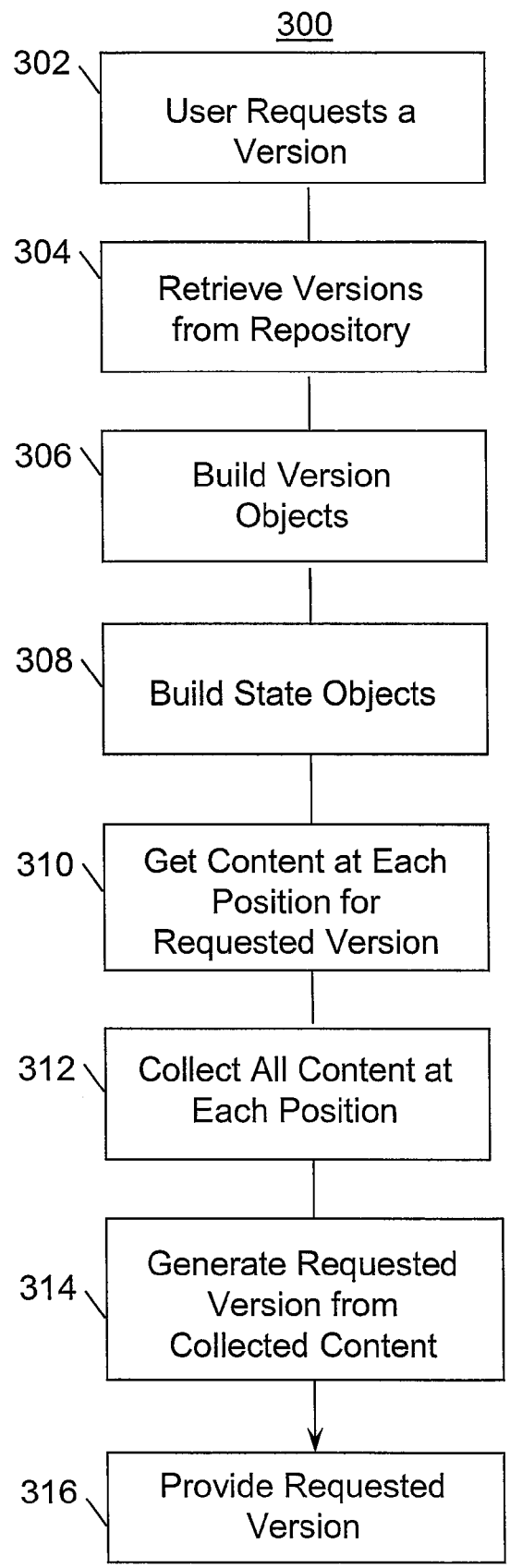
FIG. 3 illustrates an example of a process for version control according to various implementations of the invention.

FIG. 3 Illustrates a process 300, which is an example of a process for returning a requested version of a dataset according to various implementations of the invention. Process 300 may include an operation 302, wherein a specific version of a dataset stored in version control repository 112 is requested. In some implementations, the request may be made by a user operating at a client machine 102 (or other access point to system 100), an application or process requiring the requested version of the dataset, and/or other requestors.

In an operation 304, a closest fully stored version of the requested dataset and any deltas for versions between the requested version and the fully stored version (including any deltas for the requested version) necessary to generate the requested versions are retrieved from the version control repository 112 in response to the request. Retrieval of full versions and necessary deltas from version control repository 112 may include, for example, using database queries or file input/output (IO) according to various implementations of the invention.

In an operation 306, version objects may be instantiated for each retrieved full version and each version between the requested version and the full version, including the requested version. In one embodiment, if a version is represented by the stored full dataset (e.g., use of deltas is not necessary), positions of the document are collocated with their corresponding content and stored (in memory) for quick access. Version objects representing the retrieved full dataset may include content of the fully stored version and corresponding position information for the content. Versions that are not fully stored datasets may be referred to as "delta versions." Delta versions may include only content changed from the relevant adjacent version and position information for the changed content.

In an operation 308, state objects may be instantiated for each version object. The instantiated state object may include a dynamic indicator that tracks a "current position" for a version object as the version object is used in constructing a requested version. The state object may also include a dynamic indicator that tracks a "current delta" for a version object as the version object is used in constructing a requested version. For example, a plurality of deltas may exist at a position in a version object. In some implementations, the current delta may indicate which delta may be applied amongst the plurality of deltas existing at the position in the version object. Tracking the "current position" for a version object may be used during recursive versioning because a call to a version object to return content may rely upon the version object knowing which position to retrieve to apply the content at that position. Each time content at the state object's current position is requested from its corresponding version object, the "current position" of the state object is incremented. Additionally, state objects may describe which adjacent version is relevant for retrieving the requested version (a prior version for forward deltas; a subsequent version for reverse deltas).

Once the version and state objects are instantiated, the requested version is generated in an operation 310 via a recursive versioning process. In some implementations, operation 310 generates the requested version by retrieving content at each "position" of the requested dataset version, beginning with the first position as the "current position" and iteratively advancing to subsequent positions of the requested version as the "current position." For the current position, operation 310 recursively retrieves content from all interim versions of the dataset. Recursive retrieval of content from all interim versions includes reconciling content and changes between adjacent versions to arrive at the correct content at the current position for the requested version. Operation 312 may collect content during the process of retrieving content for each position in the requested version until content for each position in the requested version has been generated. In an operation 314, the requested version may be generated based on the collected content. In an operation 316 the requested dataset version may be provided to the requester. Operation 316 may provide the requested version by writing the dataset to disk in a specified location, writing the dataset to a database, returning the dataset to a client (e.g., client 102), or otherwise returning the requested dataset.

Figure 4:
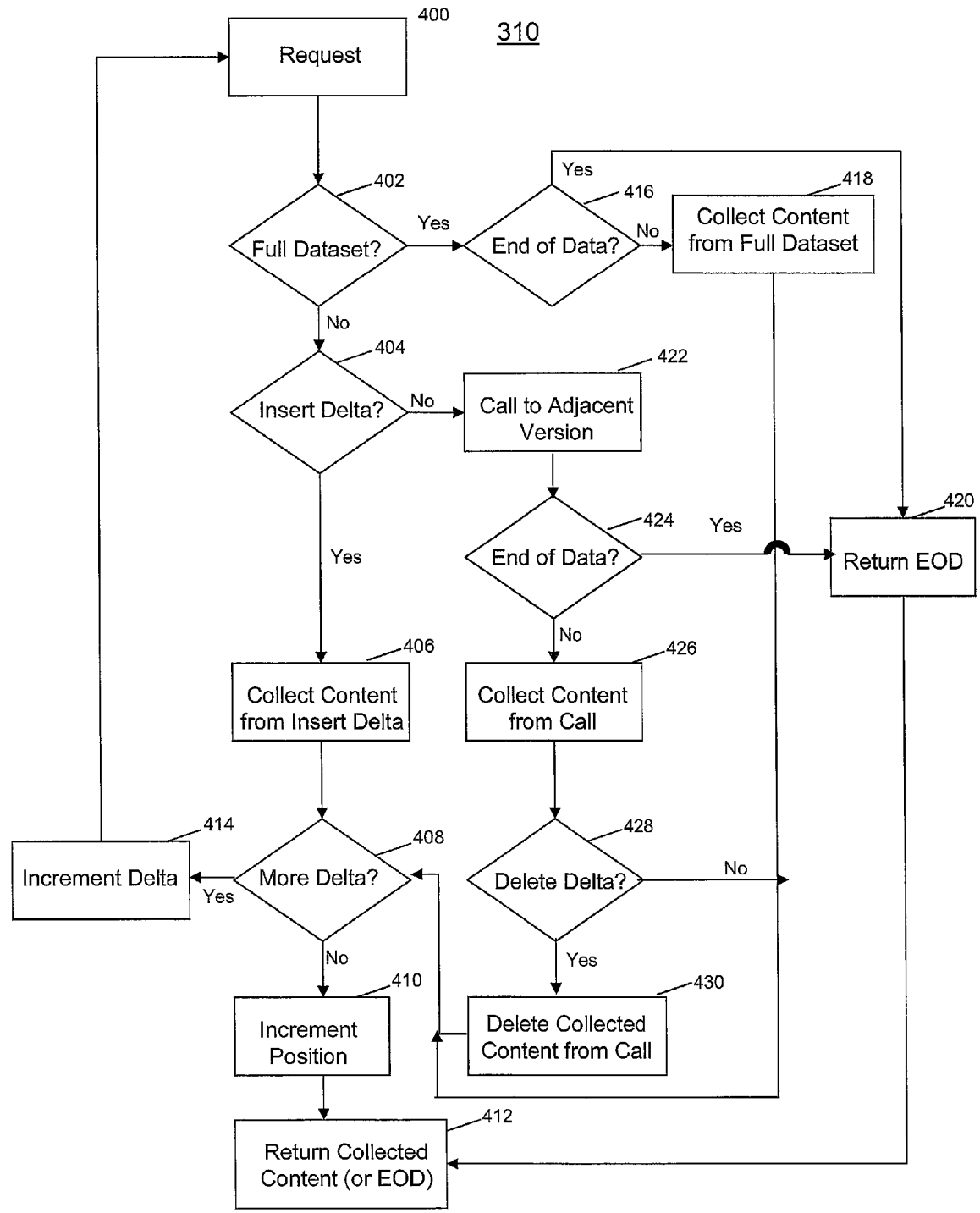
FIG. 4 illustrates an example of a recursive process according to various implementations of the invention.

FIG. 4 illustrates process 310 according to various implementations of the invention. Process 310 includes an operation 400, wherein a call to retrieve content at a current position of a version object is made. In an operation 402, if a state object corresponding to the version object indicates that the version corresponding to the version object is not represented by a fully stored dataset, then process 310 proceeds to an operation 404. In operation 404, if an insert delta exists at the current position, then process 310 proceeds to an operation 406, wherein content from the insert delta is collected. Process 310 continues to operation 408, wherein if no more deltas are present at the current position, then process 310 proceeds to an operation 410. In operation 410, the current position is incremented at the state object and the collected content is returned to the calling process in an operation 412.

Returning to operation 402, if the state object corresponding to the version object indicates that the version corresponding to the version object is represented by a fully stored dataset, then process 310 proceeds to an operation 416. In operation 416, if an end of data indicator exists at the current position, then process 310 proceeds to an operation 420, wherein the end of data indicator is returned to the calling process at operation 412. Returning to operation 416, if an end of data indicator does not exist at the current position, then process 310 proceeds to an operation 418, wherein content at the current position from the fully stored dataset is collected. Process 310 then proceeds to operation 410, wherein the current position is incremented at the state object and the collected content is returned to the calling process in an operation 412.

Returning to operation 404, if an insert delta does not exist at the current position, then process 310 proceeds to an operation 422, wherein a call is made to an adjacent version object to initiate a request 400 to the adjacent version object (i.e., process 310 is run for the adjacent version object to return content to the calling version object). Process 310 proceeds to an operation 424, wherein if an end of data indicator is returned by the call to the adjacent version object at operation 422, then process 310 proceeds to operation 420, wherein the end of data indicator is returned to the calling version at operation 412.

Returning to operation 424, if an end of data indicator is not returned by the call to the adjacent version object at operation 422, process 310 proceeds to an operation 426, wherein content returned from the call to the adjacent version object at operation 422 is collected. Processing proceeds to an operation 428, wherein if the delete delta is present at the current position, the content collected at operation 426 is removed at an operation 430, and process 310 proceeds to operation 408.

Returning to operation 428, if the delete delta is not present at the current position, the collected content from operation 426 is retained and process 310 may proceed to operation 408.

Returning to operation 408, if more deltas are present at the current position, then processing proceeds to operation 414, wherein a delta indicator for this position is decremented at the state object corresponding to the version object and process 310 returns to operation 400.

In this manner the content for all positions of the requested version using recursive calls to adjacent versions, back to the nearest fully stored version of the dataset, may be generated by successively applying deltas at each adjacent version.

Figure 5:
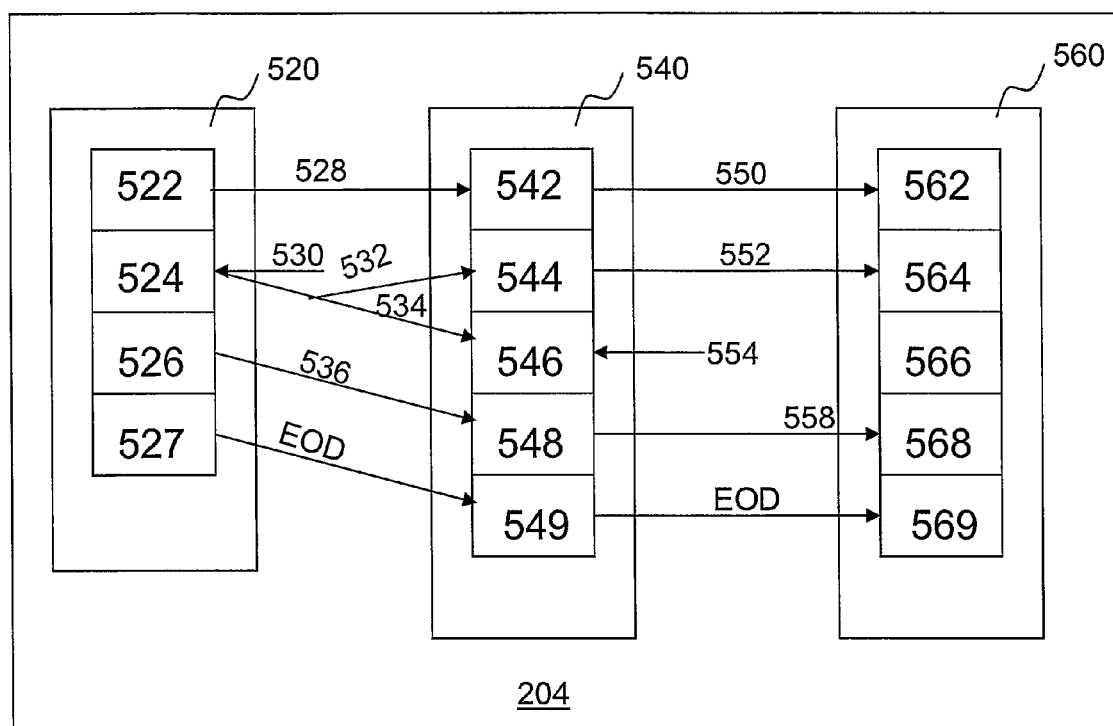
FIG. 5 illustrates an example of versioning according to various implementations of the invention.

FIG. 5 illustrates an example according to various implementations of the invention where three versions of a text document exist, forward deltas are used for versioning, and line numbers are used for position indicators. Object 520 represents version 3, which is the requested version of the dataset. Positions 522, 524, and 526 represent the first, second, and third lines in object 520, respectively. Position 527 represents an end of data indication, which is the position at where the dataset ends. For example, the complete content of version 3 may be as follows, wherein "complete content" means the entire dataset as it appears after the request to produce the version has been executed by applying all deltas:

| 522 | This is |
| 524 | THE CONTENTS |
| 526 | of the component. |

Object 540 represents version 2 of the requested document. Positions 542, 544, 546, and 548 represent the first, second, third and fourth lines in object 540, respectively. Position 549 represents an end of data indication. For example, the complete content of version 2 may be as follows:

| 542 | This is |
| 544 | the contents |
| 546 | of version 2 |
| 548 | of the component. |

Object 560 represents version 1 (the at least one full dataset). Positions 562, 564, 566, and 568 represent the first, second, third, and fourth lines in object 560, respectively. Position 569 represents an end of data indication. For example, the complete content may be as follows:

| 562 | This is |
| 564 | the contents |
| 566 | of version 1 |
| 568 | of the component. |

Supposing version 3 is requested, recursion module 204 uses object 520 to generate the requested document version. Object 520 retrieves position 522 by calling itself using method 400. Object 520's state object indicates that it is derived from a delta and not a fully stored document, and since no delta exists at position 522, content for the current position in object 540 is used. A recursive call 528 to object 540 ascertains the current position 542 of object 540 from the state object. "This is" at position 542 is ascertained, object 540's current state is incremented to 544 and "This is" is returned.

Position 542 itself was obtained by a recursive call 550 to object 560 to return its current position 562. Position 562 corresponds to the first line in the fully stored document and therefore simply returns the line "This is." Object 560's current state is incremented to 564. Once position 522 has been ascertained, object 520's current position is incremented to 524. Recursion module 204 then executes a second call to retrieve content at the next current position in object 520. The current position 524 results from a delta instructing to insert one line and delete two lines at position 524. In some implementations this represents three instructions at this position. In particular, insertion of "THE CONTENTS" and deletion of "the contents" and "of version 2" is instructed.

A self-call to object 520 ascertains the content at position 524 by inserting "THE CONTENTS." A second self-call executes a recursive call 532 to object 540 to retrieve object 540's next current content 544. Object 540 increments its current position to be 546 and returns content "the contents" at position 544. Because "the contents" is instructed to be deleted, it is ignored. A third self-call to object 520 at position 524 executes another recursive call 534 to retrieve object 540 content at its next current position. Content for object 540 current position 546 is recursively determined to be "of version 2" because of self call 554 inserting "of version 2" and recursive call 556 that deletes "of version 1." The third self-call to object 520 at position 524 ignores the returned "of version 2" since it was instructed to be deleted.

Once all instructions for the delta at position 524 are exhausted, object 520 current position is incremented to 526. The next self-call to object 520 ascertains content for current position 526. Because there are no deltas at this position, content at 526 is the content returned from a recursive call to retrieve content for object 540's next current position 548. This returns "of the component" after recursive call 558 to object 560 that retrieves content at position 568. Object 520 increments its current position. At position 528, another recursive call to object 540 is used. Object 540 recursively calls object 560, which has exhausted all of its positions. Object 560 therefore returns an end of data indication, which object 540 receives and returns to object 520. Upon receipt of an end of data indication, object 520 has ascertained content at all of its positions and returns the completely generated content.

Implementations of the invention may be made in hardware, firmware, software, or any suitable combination thereof. The invention may also be implemented as instructions stored on a tangible computer readable medium, which may be read and executed by one or more processors. A tangible computer readable medium may include any mechanism for storing or transmitting information in a form readable by a machine (e.g., a computing device). For example, a tangible computer readable medium may include read only memory, random access memory, magnetic disk storage media, optical storage media, flash memory devices, and others. Further, firmware, software, routines, or instructions may be described in the above disclosure in terms of specific exemplary aspects and implementations of the invention, and performing certain actions. However, it will be apparent that such descriptions are merely for convenience and that such actions in fact result from computing devices, processors, controllers, or other devices executing the firmware, software, routines, or instructions.

Aspects and implementations may be described as including a particular feature, structure, or characteristic, but every aspect or implementation may not necessarily include the particular feature, structure, or characteristic. Further, when a particular feature, structure, or characteristic is described in connection with an aspect or implementation, it will be understood that such feature, structure, or characteristic may be included in connection with other aspects or implementations, whether or not explicitly described. Thus, various changes and modifications may be made to the provided description without departing from the scope or spirit of the invention. As such, the specification and drawings should be regarded as exemplary only, and the scope of the invention to be determined solely by the appended claims.

What is claimed is:

1. A computer-implemented method to retrieve a particular version of a document having a plurality of versions, the method comprising:
   receiving a request to generate a particular version of a document from among a plurality of versions of the document, wherein generating the particular version comprises transforming a partial form of the particular version represented by a delta of the particular version into complete contents of the particular version using at least the delta, wherein the delta is stored in a repository, and the delta corresponds to a change to data at a position in the requested particular version of the document relative to an adjacent version of the document;
   transforming the partial form into the complete contents of the particular version comprising:
      retrieving the delta corresponding to the requested particular version of the document,
      recursively determining adjacent data corresponding to the delta at the adjacent version of the document,
      applying the delta to the determined adjacent data,
      generating data accounting for the change to data at the position based on the applied delta, and
      generating the complete contents of the requested particular version of the document based at least in part on the generated data for the delta, wherein the complete contents of the requested particular version of the document is generated without generating the adjacent version of the document in its entirety; and
   presenting the requested particular version in response to the received request.

2. The computer-implemented method of claim 1, wherein the adjacent version of the document comprises a second delta, and wherein recursively determining adjacent data comprises:
   retrieving the second delta corresponding to the adjacent version of the document, wherein the second delta corresponds to a change to data at a position in the adjacent version of the document relative to a second adjacent version of the document, wherein the second adjacent version of the document is adjacent to the adjacent version of the document;
   recursively determining second adjacent data corresponding to the second delta at the second adjacent version of the document;
   applying the second delta to the determined second adjacent data;
   generating second data based on the applied second delta;
   generating the adjacent data based on the generated second data; and
   returning the adjacent data.

3. The computer-implemented method of claim 1, wherein the adjacent version of the document is a fully stored version of the document.

4. The computer-implemented method of claim 1, wherein the delta is a forward delta, wherein a fully stored version of the document is a prior version of the document relative to a delta version of the document.

5. The computer-implemented method of claim 1, wherein the delta is a reverse delta, wherein a fully stored version of the document is a subsequent version of the document relative to a delta version of the document.

6. The computer-implemented method of claim 1, wherein the delta is an insert delta.

7. The computer-implemented method of claim 1, wherein the delta is a delete delta.

8. The computer-implemented method of claim 1, wherein the document is text and the position is a line number.

9. The computer-implemented method of claim 1, wherein the document is binary and the position is a byte location.

10. The computer-implemented method of claim 1, further comprising:
   tracking a current position while recursively determining adjacent data.

11. The computer-implemented method of claim 10, further comprising:
   tracking a current delta being applied.

12. A non-transitory tangible computer readable medium storing computer executable instructions to retrieve a particular version of a document having a plurality of versions, the instructions operable when executed to:
   receive a request to generate a particular version of a document from among a plurality of versions of the document, wherein generating the particular version comprises transforming a partial form of the particular version represented by a delta of the particular version into complete contents of the particular version using at least the delta, wherein the delta is stored in a repository, and the delta corresponds to a change to data at a position in the requested particular version of the document relative to an adjacent version of the document;
   transform the partial form into the complete contents of the particular version, wherein, to transform, the instructions are further operable when executed to:
      retrieve the delta corresponding to the requested particular version of the document,
      recursively determine adjacent data corresponding to the delta at the adjacent version of the document,
      apply the delta to the determined adjacent data,
      generate data accounting for the change to data at the position based on the applied delta, and
      generate the complete contents of the requested particular version of the document based at least in part on the generated data for the delta wherein the complete contents of the requested particular version of the document is generated without generating the adjacent version of the document in its entirety; and present the requested particular version in response to the received request.

13. The non-transitory tangible computer readable medium of claim 12, wherein the adjacent version of the document comprises a second delta, and wherein the instructions to recursively determine adjacent data comprises instructions further operable when executed to:

retrieve the second delta corresponding to the adjacent version of the document, wherein the second delta corresponds to a change to data at a position in the adjacent version of the document relative to a second adjacent version of the document, wherein the second adjacent version of the document is adjacent to the adjacent version of the document;

recursively determine second adjacent data corresponding to the second delta at the second adjacent version of the document;

apply the second delta to the determined second adjacent data;

generate second data based on the applied second delta;

generate the adjacent data based on the generated second data; and return the adjacent data.

14. The non-transitory tangible computer readable medium of claim 12, wherein the adjacent version of the document is a fully stored version.

15. The non-transitory tangible computer readable medium of claim 12, wherein the delta is a forward delta, wherein a fully stored version of the document is a prior version of the document relative to a delta version of the document.

16. The non-transitory tangible computer readable medium of claim 12, wherein the delta is a reverse delta, wherein a fully stored version of the document is a subsequent version of the ddcument relative to a delta version of the document.

17. The non-transitory tangible computer readable medium of claim 12, wherein the delta is an insert delta.

18. The non-transitory tangible computer readable medium of claim 12, wherein the delta is a delete delta.

19. The non-transitory tangible computer readable medium of claim 12, wherein the document is text and the position is a line number.

20. The non-transitory tangible computer readable medium of claim 12, wherein the document is binary and the position is a byte location.

21. The non-transitory tangible computer readable medium of claim 12, wherein the instructions are further operable when executed to:

track a current position while recursively determining adjacent data.

22. The non-transitory tangible computer readable medium of claim 21, wherein the instructions are further operable when executed to:

track a current delta being applied.

23. A system to retrieve a particular version of a document having a plurality of versions, the system comprising:

a processor configured to:

receive a request to generate a particular version of a document from among a plurality of versions of the document, wherein generating the particular version comprises transforming a partial form of the particular version represented by a delta of the particular version into complete contents of the particular version using the delta, wherein the delta is stored in a repository, and the delta corresponds to a change to data at a position in the requested particular version of the document relative to an adjacent version of the document;

transform the partial form into the complete content of the particular version, wherein, to transform, the processor is further configured to:

retrieve the delta corresponding to the requested particular version of the document, recursively determine adjacent data corresponding to the delta at the adjacent version of the document, apply the delta to the determined adjacent data, generate data accounting for the change to data at the position based on the applied delta, and generate the complete contents of the requested particular version of the document based at least in part on the generated data for the delta, wherein the complete contents of the requested particular version of the document is generated without generating the adjacent version of the document in its entirety; and present the requested particular version in response to the received request.

24. The system of claim 23, wherein the adjacent version of the document comprises a second delta, and wherein the processor configured to recursively determine adjacent data is further configured to:

retrieve the second delta corresponding to the adjacent version of the document, wherein the second delta corresponds to a change to data at a position in the adjacent version of the document relative to a second adjacent version of the document, wherein the second adjacent version of the document is adjacent to the adjacent version of the document;

recursively determine second adjacent data corresponding to the second delta at the second adjacent version of the document;

apply the second delta to the determined second adjacent data;

generate second data based on the applied second delta;

generate the adjacent data based on the generated second data; and return the adjacent data.

25. The system of claim 23, wherein the adjacent version of the document is a fully stored version.

26. The system of claim 23, wherein the delta is a forward delta, wherein a fully stored version of the document is a prior version of the document relative to a delta version of the document.

27. The system of claim 23, wherein the delta is a reverse delta, wherein a fully stored version of the document is a subsequent version of the document relative to a delta version of the document.

28. The system of claim 23, wherein the delta is an insert delta.

29. The system of claim 23, wherein the delta is a delete delta.

30. The system of claim 23, wherein the document is text and the position is a line number.

31. The system of claim 23, wherein the document is binary and the position is a byte location.

32. The system of claim 23, wherein the processor is further configured to:

track a current position while recursively determining adjacent data.

33. The system of claim 32, wherein the processor is further configured to:

track a current delta being applied.

* * * * *